Oct. 13, 1925.

E. A. HARRIS 1,556,932

BATTERY CELL

Filed Oct. 2, 1924

Earl A. Harris, Inventor

Patented Oct. 13, 1925.

1,556,932

UNITED STATES PATENT OFFICE.

EARL A. HARRIS, OF SCRANTON, PENNSYLVANIA.

BATTERY CELL.

Application filed October 2, 1924. Serial No. 741,168.

*To all whom it may concern:*

Be it known that I, EARL A. HARRIS, a citizen of the United States, residing at Scranton, county of Lackawanna, State of Pennsylvania, have invented certain new and useful Improvements in Battery Cells, of which the following is a specification.

This invention relates to cells of storage batteries, an object of which is to provide a cell of such construction and arrangement as to enable the same to be readily and effectively cleansed and recharged with solution; the operation necessary to this end being so simple as to be capable of performance by others than those skilled in or familiar with such work.

A further object is to provide means of extremely simple nature whereby standard battery cells of the type now in use may be readily cleaned with little effort.

A still further object is to provide the battery case with means whereby cleaning may be effectively performed, and which involves no obstacle or projection in the case to preclude its proper application to the standard battery box.

A still further and particular object is to so construct a battery case that the plates therefor may be readily and properly assembled therein and removed when desired to permit of the cleaning operation, and which has its interior so constructed as to permit a cleaning fluid directed therein to reach all parts and corners of the case where sediment is most likely to accumulate.

With these objects in view, together with others which will appear as the description proceeds, the invention consists in the novel construction, combination and arrangement of parts, all as will be more fully described hereinafter, illustrated in the drawing, and particularly pointed out in the claims.

Figure 1:
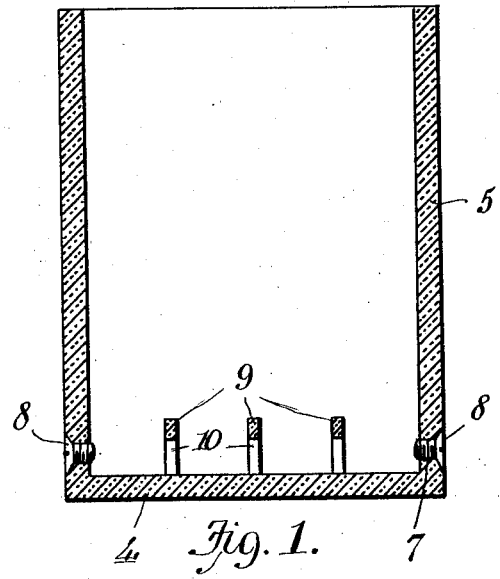
Fig. 1 is a vertical longitudinal sectional view taken through a battery case constructed in accordance with the invention.
Figure 2:
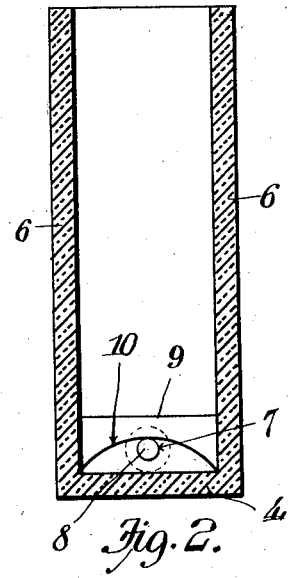
Fig. 2 is a vertical transverse sectional view taken through the case.
Figure 3:
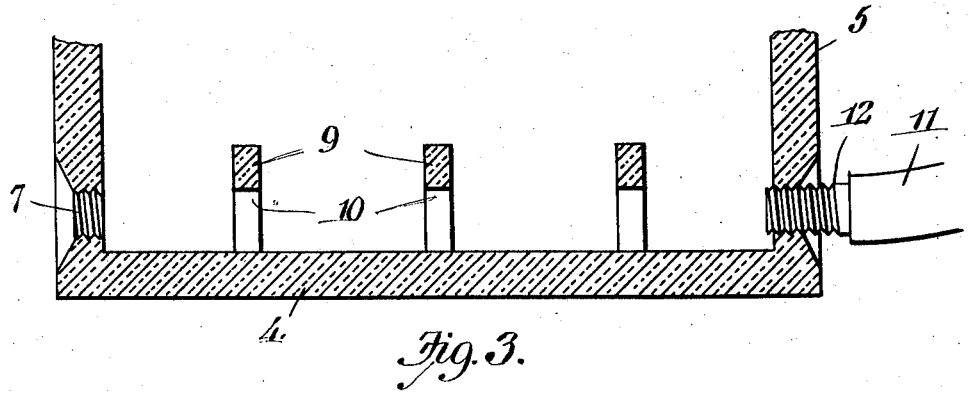
Fig. 3 is an enlarged fragmentary longitudinal sectional view through the lower part of the case.

It is generally known to users of storage batteries that sediment from the active material of the battery grids resulting from chemical action, accumulates upon the bottom of the battery cell, which eventually causes shortcircuiting when sufficient of this matter has accumulated, resulting in the deterioration of the cells and their final destruction unless such material is removed and the cells recharged. The work of removing and washing out this sediment has heretofore been attended with difficulty and usually has required the services of persons skilled in this particular line of work. A difficulty attendant upon such work is due to the fact that the battery cells when connected together in the usual manner, as by bus-bars or burned connections, are inaccessible, it being necessary frequently to disconnect the cells of a series at the expenditure of considerable time and labor. Furthermore, in such operations, the machine with which the battery is associated must remain out of service until this operation has been completed, or must be provided with a substitute set of battery cells.

As heretofore stated, a particular object of the invention is to provide means whereby the battery case may be readily cleaned or washed out by one unskilled in such work without the necessity of entirely disorganizing the battery outfit.

In carrying out the invention the cell which comprises a bottom 4, end walls 5 and side walls 6, is provided preferably in its end walls and near the floor or bottom thereof with openings 7 aligned with each other and normally closed by plugs indicated at 8. It is preferred that these openings be so close to the bottom or floor of the cell that water or sediment may be readily drained therethrough. The plugs for closing these openings are perferably threaded into the same, and are countersunk at their outer ends so that when driven home the ends thereof will lie flush with the outer surface of the ends 5 of the case.

The case is provided, as usual, with ribs or supports for the plates, and in carrying out the present invention these ribs, indicated at 9, are disposed a proper distance above the floor of the case, transversely of the latter, and have their lower edges cut away as at 10 to permit of the free passage of washing fluid and sediment beneath the said ribs.

When it is desired to cleanse the cell, both plugs 8 are removed and a jet of water or other cleaning fluid is directed into one of the openings 7. The pressure of the liquid will loosen the sediment and cause the same to be violently agitated and driven through the opening 7 at the opposite end of the cell, and this operation continues until all sediment has been removed from the cell. After this, the plugs 8 are applied and driven home so as to make a liquid proof closure for the openings 7, whereupon the cell may be supplied with a fresh solution.

As heretofore stated, the openings 7 are threaded to receive the plugs 8, and the tube 11 through which the cleaning fluid is projected, may be equipped with a threaded nozzle 12 to engage with the threads of the said opening. This will greatly facilitate cleaning and will be found most expedient where the cleaning fluid may be projected under high pressure.

From the foregoing, it is apparent that I have provided a battery cell thoroughly capable of performing the several objects set forth, and by the use of which the cleaning and renovating of storage battery cells is greatly facilitated. By having the plugs 8 counter-sunk in the manner shown and described, there are no projections whatever upon the cell to impede its application to the standard battery case or box, and no dis order in the device can thus arise.

While the above is a disclosure of the invention in its preferred embodiment, it is apparent that changes in the location of the openings as well as the formation and arrangement of the ribs may be resorted to, if desired, without departing from the spirit of the invention as set forth in the claims.

Having thus described my invention, I claim:

1. A battery cell having openings at the sides thereof alined with each other and disposed substantially at the floor of the cell.

2. A battery cell comprising a floor and side walls, the said walls having openings therein alined with each other and at approximately the floor level of the cell, and plugs to close said openings.

3. A battery cell comprising a floor and side walls, ribs extending laterally of said cell and having their lower edges above the said floor, and the said walls having openings therein at approximately the floor level of the cell.

4. A battery cell comprising a floor and side walls, the said walls having openings therein alined with each other, the said openings being counter-sunk on the outer faces of the walls, and plugs for insertion in said openings and to be received in said countersunk portions.

5. A battery cell comprising a floor and side walls, the said walls having openings therein alined with each other, ribs in said cell spaced upwardly from the said bottom and above said openings, and screw plugs for insertion in said openings and adapted to lie flush with the outer faces of said walls.

In testimony whereof I affix my signature.

EARL A. HARRIS.